United States Patent Office 3,459,855
Patented Aug. 5, 1969

3,459,855
HYDROXOCOBALAMINE COMPLEXES
Yvonne Thuillier, Paris, France, assignor to Laboratoires Albert Rolland, Paris, France, a French society
Filed Feb. 6, 1967, Ser. No. 614,138
Claims priority, application France, Feb. 10, 1966, 49,062
Int. Cl. A61k *25/02;* C07d *55/62*
U.S. Cl. 424—201  3 Claims

ABSTRACT OF THE DISCLOSURE

The invention provides complexes formed by the interaction of iodo-aryl-aliphatic amino-acids such as 3,5-diiodo-tyrosine with hydroxocobalamine, useful as anti-anaemia agents, stimulators of the central nervous system, stimulators of basal metabolism, and agents for lowering cholesterolaemia.

---

This invention relates to hydroxocobalamine complexes.

The new complexes of the invention are those formed between hydroxocobalamine and iodo-aryl-aliphatic amino-acids. The preferred such acids are iodo phenylalanine derivatives such as the iodo-tyrosines and iodo-thyronines, and, in particular, 3,5-diiodo-tyrosine. In the new complexes, the carboxyl group of the amino acids reacts with the hydroxy group of the hydroxocobalamine to form a compound of the general formula:

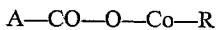

where A—COOH is the iodo-aryl-aliphatic amino acid and HO—Co—R is hydroxocobalamine. For example, when the preferred 3,5-diiodo-tyrosine is used, the complex has the formula:

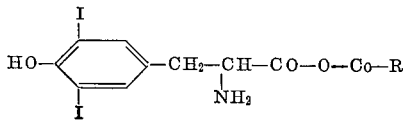

These new compounds have useful medicinal and pharmaceutical properties, in particular as anti-anaemia agents, stimulators of the central nervous system, stimulators of basal metabolism, and agents for lowering cholesterolaemia.

According to a feature of the invention, the new complexes are made by a process which comprises reacting the amino-acid with the hydroxocobalamine, preferably in an aqueous medium at a moderately elevated temperature. The complex formed may be isolated by precipitation with acetone and filtration.

The following example illustrates the invention.

EXAMPLE 1

3,5-diiodo-tyrosine (10 g.) is dissolved in hot water (1 litre), and an equal molecular quantity of hydroxocobalamine (18 g.) is added. The mixture is allowed to cool. The reaction is complete when no precipitation is observed on chilling the reaction mixture. The mixture is filtered and then treated for 24 hours in the cold with 6–8 volumes of acetone. The crystals which separate are filtered off, and dried by washing, first with pure acetone and then with ether. Finally they are dried in vacuo.

Figure 1:
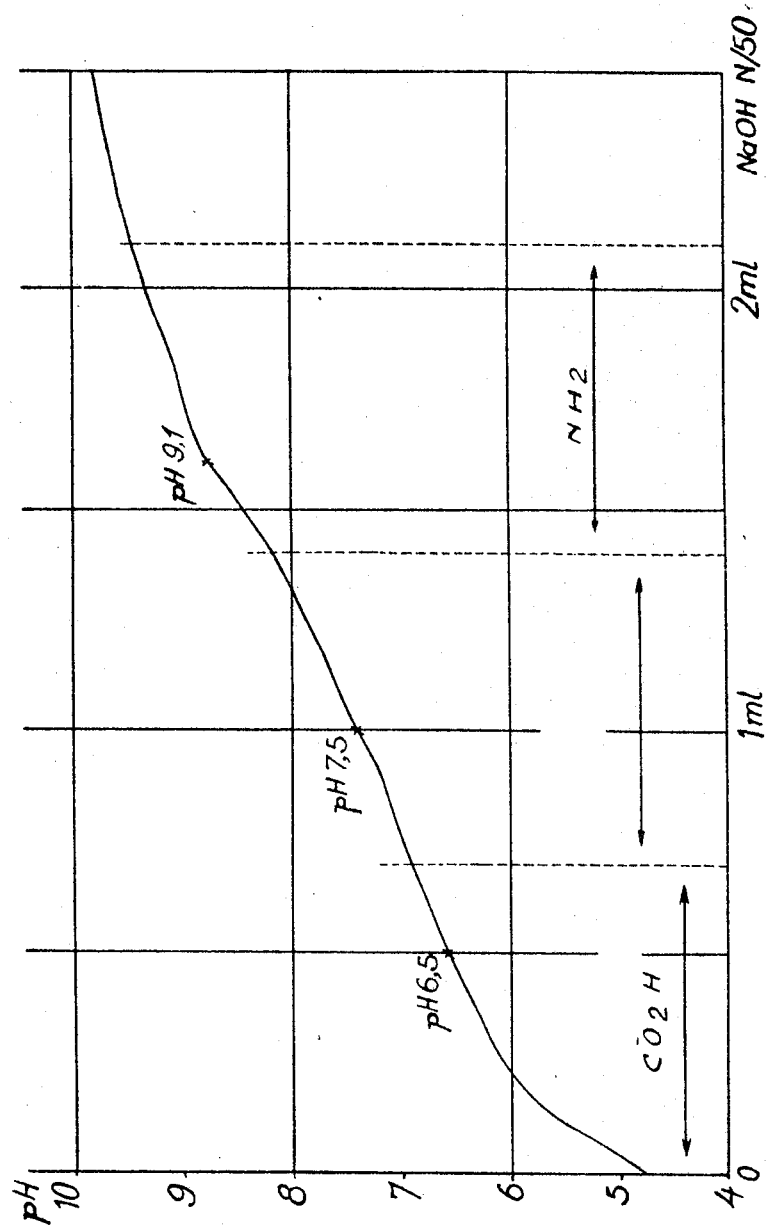

The hydroxocobalamine 3,5-diiodo tyrosinate thus obtained has the following properties. It is a dark red solid, more soluble in water than 3,5-diiodo-tyrosine, but insoluble in acetone and ether. Its molecular formula is $C_{71}H_{98}O_{17}N_{14}I_2PCo$ and its molecular weight is 1763. It cannot be identified by its melting point, as it decomposes at above 260° C. before melting. It may be characterised by its ultra-violet absorption spectrum and by electrometric titration. The accompanying FIGURE 1 shows the electrometric titration curve of hydroxocobalamine 3,5-diiodo-tyrosinate, the ordinate showing the pH value, and the abscissa the number of millilitres of N/50 sodium hydroxide solution added. The pH of a 10% aqueous solution of the complex is about 6.5, while that of a 3,5-diiodo-tyrosine solution is about 4 and of hydroxocobalamine about 8. The electrometric titration is carried out by preparing 50 millilitres of a solution of the complex at a concentration of N/500. The electrometric titration is carried out with N/50 hydrochloric acid and N/50 sodium hydroxide solution. The pH of the solution is initially 6.5, and is brought to 4.8 by addition of the acid. The alkali is then slowly added. Three stages are successively observed. An acid stage (4.8–7) corresponding to the blocked acid function, a basic stage from 7–8.2, corresponding to hydroxocobalamine, and a stage from 8.2–9.4 corresponding to the amino group of 3,5-diiodo-tyrosine.

Figure 2:
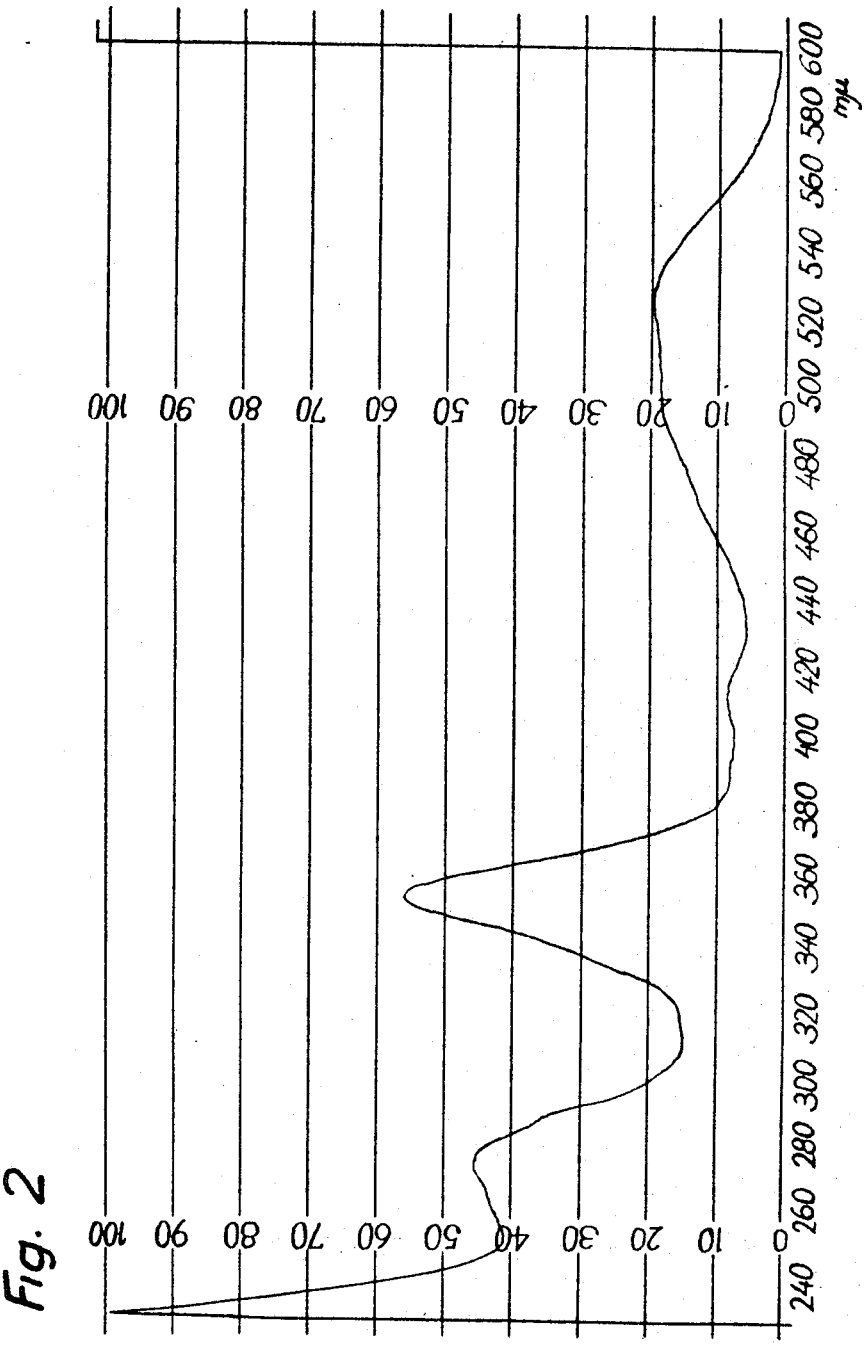

The accompanying FIGURE 2 shows the ultra-violet absorption spectrum of the complex, with a maximum absorption at about 354 m$\mu$.

Toxicological studies have shown that hydroxocobalamine 3,5-diiodo-tyrosinate shows neither acute nor chronic toxicity. The tests were as follows.

(A) Acute toxicity 20 mice, each weighing about 25 grams, received 45 mg./kg. of hydroxocobalamine 3,5-diiodo-tyrosinate by intraperitoneal injection. A second lot of 20 mice of the same size were kept as a control. After 3 days, no abnormality was observed in the behaviour of the mice. This test was repeated five times at 72-hour intervals without any mortality occurring.

(B) Chronic toxicity 3 lots of 20 mice each were used. The first lot acted as controls. The second lot received 1000 micrograms per day of hydroxocobalamine 3,5-diiodo-tyrosinate by intraperitoneal injection. The third lot received 2000 micrograms per day of the same compound also by intraperitoneal injection. No deaths occurred at the end of one month. If the injections are made subcutaneously, the same result is obtained.

The clinical effect of hydroxocobalamine 3,5-diiodo-tyrosinate has also been studied. It is very well tolerated and rapidly eliminated. Where a single etiological factor tends to destroy the thyroid gland and the gastric mucosa, it exerts a two-fold therapeutic effect. On the one hand, it exerts a preventative and curative action against anaemia. Secondly, it has interesting effects in hypometabolic states; that is to say, states of tiredness accompanied by nervousness with an impression of somnolence on awaking, and a sensation of coldness. It has a rapid and efficacious stimulant effect which counteracts the metabolic slowing down often associated with vascular degenerative syndromes, of which hypercholesterolaemia is often an early sign. In cases of hypothyroidism, a shortening of the reflexogram and a lowering of the cholestrol level are produced by the treatment.

The invention includes within its scope pharmaceutical compositions comprising a complex of the invention in association with a pharmaceutically acceptable carrier compatible therewith. Examples of suitable pharmaceutical compositions are injectable or drinkable solutions, tablets, pills, suppositories, and ointments.

Preferred compositions are injectable and drinkable solutions, for example in ampoules containing 100 to 5,000 micrograms each, and tablets containing 100 to 5,000 micrograms of active compound, the remainder of the compositions being conventional excipients. Such compositions may be administered at the rate of 1–3 tablets or ampoules per day.

The following examples illustrate pharmaceutical compositions in accordance with the invention.

EXAMPLE 2

Injectable or drinkable ampoules

Hydroxocobalamine 3,5-diiodo-tyrosinate (1000 μg.) is dissolved in an aqueous buffer (1 ml.), and the solution is placed in a sealed ampoule. If the solution is to be administered by injection, it must, of course, be sterilized, e.g. by filtration or other known means.

EXAMPLE 3

Tablet

Hydroxocobalamine 3,5-diiodo-tyrosinate (1000 μg.) is mixed with wheat starch (0.06 g.), potato starch (0.03 g.), and magnesium stearate (0.0001 g.). The mixture is compressed into tablets weighing 90 milligrams each and having a diameter of 6 millimetres.

I claim:
1. A compound of the formula

$$A\text{---}CO\text{---}O\text{---}Co\text{---}R$$

wherein A is the residue of an iodinated alpha amino carboxylic acid of the formula $A\text{---}CO_2H$ and selected from the group consisting of iodo-phenylalanine, iodo-tyrosine, iodo-tryptophane, and 3,5-diiodotyrosine, and $O\text{---}Co\text{---}R$ is the residue of hydroxocabalamine of the formula $HO\text{---}Co\text{---}R$.

2. A compound of the formula

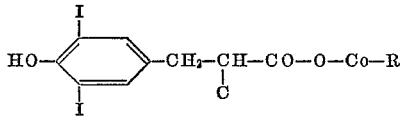

wherein $O\text{---}Co\text{---}R$ is the residue of hydroxocobalamine of the formula $HO\text{---}Co\text{---}R$.

3. A pharmaceutical composition comprising a compound of the formula according to claim 1, wherein $A\text{---}CO_2H$ is 3,5-diiodotyrosine, in association with a pharmaceutically acceptable carrier in unit dosage form.

References Cited

UNITED STATES PATENTS

| | | |
|---|---|---|
| 2,748,054 | 5/1956 | Jurist. |
| 3,035,974 | 5/1962 | Israel. |
| 3,035,983 | 5/1962 | Sherlock. |

LEWIS GOTTS, Primary Examiner

J. R. BROWN, Assistant Examiner

U.S. Cl. X.R.

260—211